United States Patent
Palmer, Jr.

(10) Patent No.: US 6,359,079 B1
(45) Date of Patent: Mar. 19, 2002

(54) DURABLE HYDROPHILIC POLYMER COATINGS

(75) Inventor: Charles Francis Palmer, Jr., Newark, DE (US)

(73) Assignee: Stepan Company, Northfield, IL (US)

(*) Notice: Subject to any disclaimer, the term of this patent is extended or adjusted under 35 U.S.C. 154(b) by 0 days.

(21) Appl. No.: 09/361,701

(22) Filed: Jul. 27, 1999

Related U.S. Application Data

(63) Continuation of application No. 08/966,607, filed on Nov. 10, 1997, now Pat. No. 6,001,935.

(51) Int. Cl.$^7$ .................. C09O 167/02; C09O 171/02
(52) U.S. Cl. ............... 525/440; 525/437; 525/444; 528/69; 528/76; 528/300; 8/115.6
(58) Field of Search ................. 525/440, 437; 528/69, 76

(56) References Cited

U.S. PATENT DOCUMENTS

| | | |
|---|---|---|
| 3,416,952 A | 12/1968 | McIntyre et al. |
| 3,557,039 A | 1/1971 | McIntyre et al. |
| 3,619,269 A | 11/1971 | McIntyre et al. |
| 3,932,356 A | 1/1976 | Takagi |
| 4,243,580 A | 1/1981 | Gale |
| 4,857,623 A | 8/1989 | Emmerling et al. |
| 5,239,019 A | 8/1993 | Halling et al. |

FOREIGN PATENT DOCUMENTS

| | | |
|---|---|---|
| EP | 0 060 430 A2 | 9/1982 |
| EP | 0 247 828 A2 | 12/1987 |
| EP | 0 424 750 A3 | 5/1991 |
| EP | 0 424 750 A2 | 5/1991 |
| EP | 0 671 424 A1 | 9/1995 |
| EP | 0 752 468 A2 | 1/1997 |
| WO | WO 96/20796 | 7/1996 |
| WO | WO 97/00351 | 1/1997 |
| WO | WO 97/22679 | 6/1997 |
| WO | WO 98/27263 | 6/1998 |

OTHER PUBLICATIONS

Nace, JAOCS, vol. 73, No. 1, 1996, Contrasts in the Surface Activity of Polyoxypropylene and Polyoxybutylene–Based Block Copolymer Surfactants, pp. 1–8.

Abstract of DE 3 629 237, Alkoxysilane–terminated, moisture–hardening polyurethanes and their use in adhesives and sealing compositions.

Abstract of J63297416, Thermosetting urethane! elastomer compsn.—contains urethane prepolymer organic poly:amine and isocyanate–free urethane cpd., useful for tyres etc.

Abstract of JP07228858–A, Washable pressure–sensitive adhesive—comprises radiation–curable resin and crosslinked polyethylene glycol.

Abstract of WO8301079, Oiling agent for synthetic fibre—contains 30 per cent or more of random addn. polymer of 1,2–butylene oxide and ethylene oxide.

Abstract of DE3935138 A, TI—Polymerisable unsatd. urethane(s) with surfactant properties—prepd. by reaction of hydroxy–poly–oxy–alkylene (alkoxy–or amindo–carboxy–alkylene(s) with mono–isocyanate(s)).

*Primary Examiner*—Patricia A. Short
(74) *Attorney, Agent, or Firm*—McDonnell Boehnen Hulbert & Berghoff

(57) ABSTRACT

Polyoxypropylamines, polypropylene oxide polymers end-capped on one or both ends with carbamate groups, di- or tri-carboxylic acids, carboxylic acid halides, or esters or mixtures comprising one of the above with a hydrophilic polyester copolymer having repeating segments of ethylene terephthalate units containing 10–50% by weight of polyoxyethylene terephthalate units useful for imparting a durable hydrophilic coating to polyester, polypropylene, polyethylene, cotton, polyamide or polyaramid fabric or fiber are disclosed.

2 Claims, No Drawings

DURABLE HYDROPHILIC POLYMER COATINGS

This is a continuation of prior application Ser. No. 08/966,607 now U.S. Pat. No. 6,001,935.

FIELD OF THE INVENTION

This invention relates to certain polymer compositions and their use to impart a durable hydrophilic coating to woven and non-woven polyester, polypropylene and polyethylene fabrics or fibers.

BACKGROUND OF THE INVENTION

Polyester, polypropylene and polyethylene woven and non-woven fabrics have many applications for which their hydrophobic characteristics are undesirable. These include applications where a high ability to transmit water is desirable, such as for diapers, adult incontinence pads, agricultural fabrics for landscaping or mulching, and some filtration devices; applications where wicking away of moisture is desirable for comfort reasons, such as for certain clothing and sportswear purposes; and applications where it is desirable to make the surface of a fiber more hydrophilic for better adhesion or easier incorporation into water-borne compositions such as cement mixtures or paper pulps.

Polypropylene or polyethylene is commonly used as the liner (coverstock) in baby diapers and adult incontinence pads, and in these applications it is next to the wearer's skin. By design, moisture must pass through the polypropylene or polyethylene layer into the absorbent layer below. Since polypropylene or polyethylene is naturally hydrophobic, it must be treated to allow the moisture to pass through quickly and not run off the top of the diaper or pad.

In diaper manufacture in the U.S. the above liner is commonly treated with a small amount of a surfactant wetting agent, such as an alcohol ethoxylate, to improve moisture transport through the polypropylene or polyethylene layer. Since the alcohol ethoxylate is usually water soluble, it dissolves and reduces the surface tension of the water. This causes the moisture to wet the polypropylene or polyethylene and pass through more quickly. The use of an alcohol ethoxylate has two important drawbacks, however. Since it dissolves off, little remains to improve passage of any second or subsequent exposures to moisture. The capacity of the absorbent layer is reduced as well, since its absorptivity is based on capillary action, which is adversely affected by absorption of the alcohol ethoxylate.

A coating is needed which would allow moisture to pass through the polypropylene or polyethylene liner quickly, but that will not readily wash off. The present invention provides such a coating and a process for its application.

Polypropylene, polyethylene or polyester are also commonly used in generation of nonwovens used in protective garments such as medical, surgical, laboratory and other garments. Such garments can be uncomfortable due to poor hand and lack of moisture transport. A coating or treatment is needed which softens the nonwoven fabrics or fibers and wicks away moisture to enhance comfort. The present invention provides such a coating or treatment. Thus the compositions, methods, fabrics and fibers of the present invention are useful in clothing applications and other applications where improved wicking or moisture transport through a woven or non-woven fabric of polyester, polypropylene or polyethylene is important. Other potential applications include usage as a softener or soil release treatments for polypropylene, polyethylene, polyester, cotton, polyamide, or polyaramid garments and slickeners for polyester fiberfill.

SUMMARY OF THE INVENTION

The present invention comprises the following compositions:

1. A mixture comprising
    A. a polymer of the following Formula I

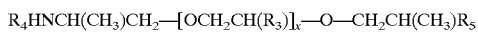

wherein x is 6–100; $R_1$ is $C_1$–$C_{24}$ alkyl $C_1$–$C_{24}$ aryl, $C_1$–$C_{24}$ alkylaryl, or $C_1$–$C_{24}$ alkenyl; $R_2$ is H or $R_1$; $R_3$ is H, $CH_3$, or $CH_2CH_3$ wherein the ratio of ($CH_3$+$CH_2CH_3$)/H in the repeat unit is greater than or equal to 6; $R_4$ is $R_2$, $R_1C(=O)$, $R_1N(R_2)C(=O)$, or $R_1$—[$OCH_2CH(R_3)$]$_x$—O—$CH_2CH(CH_3)$—$N(R_2)C(=O)$ and $R_5$ is $NHR_4$ or $OR_1$ wherein x, $R_1$ and $R_4$ are as defined above, and B. a hydrophilic polyester copolymer with repeating segments of ethylene terephthalate units containing 10–50% by weight of polyoxyethylene terephthalate units, derived from a polyoxyethylene glycol of average molecular weight of from about 300 to about 6,000, and the molar ratio of ethylene terephthalate units to polyoxyethylene terephthalate units in the polymeric compound is between 2:1 and 6:1.

2. A mixture comprising
    A. a polymer of the following Formula II

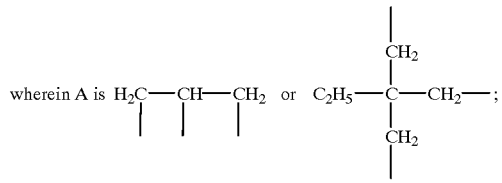

x is 6–100; $R_4$ is $R_2$, $R_1C(=O)$, $R_1N(R_2)C(=O)$ or $R_1$[$OCH_2CH(R_3)$]$_x$—O—$CH_2CH(CH_3)$—$N(R_2)C(=O)$; $R_1$ is $C_1$–$C_{24}$ alkyl, $C_1$–$C_{24}$ aryl, $C_1$–$C_{24}$ alkylaryl, or $C_1$–$C_{24}$ alkenyl; $R_2$ is H or $R_1$; $R_3$ is H, $CH_3$, or $CH_2CH_3$ wherein the ratio of ($CH_3$+$CH_2CH_3$)/H in the repeat unit is greater than or equal to 6; and $R_5$ is $R_1$—[$OCH_2CH(R_3)$]$_x$—O—$CH_2CH(CH_3)$— wherein $R_1$, $R_3$ and x are as defined above, and B. a hydrophilic polyester copolymer with repeating segments of ethylene terephthalate units containing 10–50% by weight of polyoxyethylene terephthalate units, derived from a polyoxyethylene glycol of average molecular weight of from about 300 to about 6,000, and the molar ratio of ethylene terephthalate units to polyoxyethylene terephthalate units in the polymeric compound is between 2:1 and 6:1.

3. A polymer of the following Formula III,

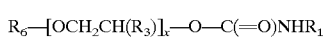

wherein x is 4–100; $R_1$ is $C_1$–$C_{24}$ alkyl, $C_1$–$C_{24}$ aryl, $C_1$–$C_{24}$ alkylaryl, or $C_1$–$C_{24}$ alkenyl; $R_2$ is H or $R_1$; $R_3$ is H, $CH_3$, or $CH_2CH_3$ wherein the ratio of ($CH_3$+$CH_2CH_3$)/H in the repeat unit is greater than or equal to 6; and $R_6$ is $R_2$ or $R_1NHC(=O)$.

4. A polymer of the following Formula IV,
    $R_1$—{[$OCH_2CH(R_3)$]$_x$—O—$C(=O)NH$—$R_1$—$NHC(=O)$—}$_y$[$OCH_2CH(R_3)$]$_x$—$OR_1$ wherein y is 1–5; x is 4–100; $R_1$ is $C_1$–$C_{24}$ alkyl, $C_1$–$C_{24}$ aryl, $C_1$–$C_{24}$ alkylaryl or $C_1$–$C_{24}$ alkenyl; and $R_3$ is H, $CH_3$, or $CH_2CH_3$ wherein the ratio of $(CH_3+CH_2CH_3)/H$ in the repeat unit is greater than or equal to 6; and the molecular weight is below about 10,000.

5. A mixture comprising a polymer of Formula III as defined above and a hydrophilic polyester copolymer with repeating segments of ethylene terephthalate units containing 10–50% by weight of polyoxyethylene terephthalate units, derived from a polyoxyethylene glycol of average molecular weight of from about 300 to about 6,000, and the molar ratio of ethylene terephthalate units to polyoxyethylene terephthalate units in the polymeric compound is between 2:1 and 6:1.

6. A mixture comprising a polymer of Formula IV as defined above and a hydrophilic polyester copolymer with repeating segments of ethylene terephthalate units containing 10–50% by weight of polyoxyethylene terephthalate units, derived from a polyoxyethylene glycol of average molecular weight of from about 300 to about 6,000, and the molar ratio of ethylene terephthalate units to polyoxyethylene terephthalate units in the polymeric compound is between 2:1 and 6:1.

7. A polymer of the following Formula V

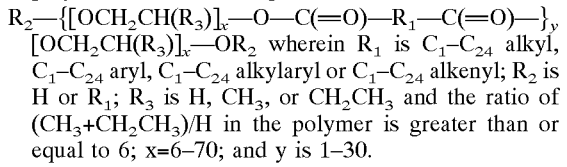
$R_2$—{[$OCH_2CH(R_3)$]$_x$—O—C(=O)—$R_1$—C(=O)—}$_y$ [$OCH_2CH(R_3)$]$_x$—$OR_2$ wherein $R_1$ is $C_1$–$C_{24}$ alkyl, $C_1$–$C_{24}$ aryl, $C_1$–$C_{24}$ alkylaryl or $C_1$–$C_{24}$ alkenyl; $R_2$ is H or $R_1$; $R_3$ is H, $CH_3$, or $CH_2CH_3$ and the ratio of $(CH_3+CH_2CH_3)/H$ in the polymer is greater than or equal to 6; x=6–70; and y is 1–30.

8. A mixture comprising a polymer of Formula V as defined above and a hydrophilic polyester copolymer with repeating segments of ethylene terephthalate units containing 10–50% by weight of polyoxyethylene terephthalate units, derived from a polyoxyethylene glycol of average molecular weight of from about 300 to about 6,000, and the molar ratio of ethylene terephthalate units to polyoxyethylene terephthalate units in the polymeric compound is between 2:1 and 6:1.

The present invention further comprises the following methods: A method for imparting a durable hydrophilic coating to polyester, polypropylene, polyethylene, cotton, polyamide or polyaramid fabric or fiber comprising application to the surface of the fabric or fiber of an effective amount of at least one composition selected from the group consisting of Formula I through V as defined above, or an effective amount of a mixture comprising one of Formula I through V and a hydrophilic polyester copolymer with repeating segments of ethylene terephthalate units containing 10–50% by weight of polyoxyethylene terephthalate units, derived from a polyoxyethylene glycol of average molecular weight of from about 300 to about 6,000, and the molar ratio of ethylene terephthalate units to polyoxethylene terephthalate units in the polymeric compound is between 2:1 and 6:1.

A method for imparting a durable hydrophilic coating to polyester, polypropylene, polyethylene, cotton, polyamide, or polyaramid fabric or fiber comprising application to the surface of the fabric or fiber of an effective amount of at least one composition selected from the group consisting of Formula I through V as defined above, or an effective amount of a mixture comprising one of Formula I through V and ZELCON.

The present invention further comprises the following fabrics or fibers: A woven or nonwoven polyester, polyethylene, polypropylene, cotton, polyamide or polyaramid fabric or fiber having applied to its surface an effective amount of at least one of the compositions selected from the group consisting of Formula I through V as defined above, or an effective amount of a mixture comprising one of Formula I through V and a hydrophilic polyester copolymer with repeating segments of ethylene terephthalate units containing 10–50% by weight of polyoxyethylene terephthalate units, derived from a polyoxyethylene glycol of average molecular weight of from about 300 to about 6,000, and the molar ratio of ethylene terephthalate units to polyoxyethylene terephthalate units in the polymeric compound is between 2:1 and 6:1.

A woven or nonwoven polyester, polyethylene, polypropylene, cotton, polyamide, or polyaramid fabric or fiber having applied to its surface an effective amount of at least one composition selected from the group consisting of Formula I through V as defined above, or an effective amount of a mixture comprising one of Formula I through V and ZELCON.

The term "ZELCON" as used herein means a hydrophilic polyester copolymer with repeating segments of ethylene terephthalate units containing 10–50% by weight of polyoxyethylene terephthalate units, derived from a polyoxyethylene glycol of average molecular weight of from about 300 to about 6,000, and the molar ratio of ethylene terephthalate units to polyoxyethylene terephthalate units in the polymeric compound is between 2:1 and 6:1. A more preferred copolymer is that wherein the polyoxyethylene terephthalate units are derived from a polyoxyethylene glycol with an average molecular weight of from about 1,000 to about 4,000. These hydrophilic copolyesters are available commercially under the ZELCON tradename from E. I. du Pont de Nemours and company, Wilmington, Del.

DETAILED DESCRIPTION OF THE INVENTION

The present invention comprises compositions that when applied to polyester, polypropylene or polyethylene fabric or fiber impart a durable hydrophilic coating. The present invention further comprises methods for imparting a durable hydrophilic coating to polyester, polypropylene and polyethylene fabric or fiber comprising application of the compositions as described above. The present invention further comprises, in woven or nonwoven form, polyester, polypropylene, or polyethylene fabric or fiber having such a coating applied to its surface.

By the term "organic solvent" is meant those organic solvents incapable of forming three dimensional networks of strong hydrogen bonds. Examples of suitable solvents include dibasic esters, esters (for example ethyl acetate), ketones (for example acetone), ethers (for example tetrahydrofuran), and tertiary amides (for example dimethylformamide or dimethylacetamide).

The term "hydrophilic copolyester" is used to mean a copolyester containing both polyoxyethylene diester and alkylene diester segments. They may be simple copolyesters, i.e., they contain only polyoxyethylene diester and polyalkylene diester segments, the copolyester being derived from a single polyethylene oxide, diester and glycol. Polyethylene oxides of various molecular weights, dimethyl terephthalate and ethylene glycol are the most common raw materials for these copolymers, mainly because of cost and availability. Numerous variations on the comonomers used to prepare these simple hydrophilic copolyesters are possible. Other alkylene glycols such as propylene and butylene glycols are suitable for the replacement of all or part of the ethylene glycol, or they are incorporated in minor amounts into the polyethylene oxide employed. Simple ether glycols such as diethylene glycol, and cycloaliphatic diols such as 1,4-cyclohexane dimethanol, are also appropriate as comonomers for the base copolyesters. Among other diesters that are used to replace all or part of the dimethyl terephthalate are diesters of aliphatic diacids such as adipic and sebacic acids, and diesters of aromatic diacids such as isophthalic and sulfonated isophthalic acids. The base copolymers may additionally contain one or more of the other components, e.g., an acidic group, a basic group, an ionizable salt group, an antioxidant group, a group that absorbs ultraviolet light, a dyestuff group and polymeric groups containing a plurality of either hydroxy groups or amido groups, all of which are disclosed by McIntyre et al. in U.S. Pat. Nos. 3,416,952; 3,557,039; and 3,619,269.

The hydrophilic copolyesters are prepared by condensation at relatively high temperatures under reduced pressures. Temperatures of about 200 to 280° C., or even higher, and pressure not higher than about 35 mm Hg are generally employed. Byproduct alcohols and part of the low molecular weight glycols originally charged are removed by distillation during the condensation process. As the process proceeds the viscosity of the copolyester increases.

A preferred hydrophilic copolyester is a polyester copolymer with repeating segments of ethylene terephthalate units containing 10–50% by weight of polyoxyethylene terephthalate units, derived from a polyoxyethylene glycol of average molecular weight of from about 300 to about 6,000, and the molar ratio of ethylene terephthalate units to polyoxyethylene terephthalate units in the polymeric compound is between 2:1 and 6:1. A more preferred copolymer is that wherein the polyoxyethylene terephthalate units are derived from a polyoxyethylene glycol with an average molecular weight of from about 1,000 to about 4,000. These copolymers are disclosed in U.S. Pat. No. 3,416,952. Examples of these copolymers include those commercially available under the tradename ZELCON 5126 (available from E.I. du Pont de Nemours and Company, Wilmington, Del.) and MILEASE T (available from Imperial Chemical Industries, Limited, London, England); both have the Chemical Abstracts Service Registry No. 9016-88-0. Both ZELCON 5126 and MILEASE T are sold in the aqueous dispersion form containing up to 85% water. It is preferable to use the dehydrated polymer to prepare the dispersions to avoid the incorporation of excess moisture. The dehydrated polymer is obtained by drying the above-mentioned commercial dispersions, or can be obtained in the concentrated form from the manufacturers. An example of the latter is ZELCON PG, the concentrated form of ZELCON 5126, and is obtainable from the E.I. du Pont de Nemours and Company, Wilmington, Del.

In addition, these hydrophilic polyesters may be further modified after being formed by reaction with one or more polyols containing three or more hydroxy groups or one or more polyoxyethylene glycols or a mixture of one or more of such polyols and one or more of such glycols, as disclosed in U.S. Pat. No. 5,239,019. The modified copolyesters are hydrophilic in nature. They consist of polyols containing three or more hydroxy groups, and polyoxyethylene glycols. The polyols may also contain other functional groups such as, e.g., ester and ether groups. Examples of polyols suitable for modification of the copolyesters include simple polyols such as glycerin, pentaerythritol and sorbitol, low molecular weight ether polyols derived from the simple polyols such as diglycerol and di- and tripentaerythritol, and polymeric polyols such as the partially hydrolyzed polyvinyl acetates and partially esterified derivatives of cellulose. Ethylene oxide adducts of the above polyols are also suitable. The polyoxyethylene glycols may vary in molecular weight from about 300 to 6,000 depending on the intended application. Molecular weights of about 600 to 3,000 are preferred, with 800 to 1,600 being most preferred. Besides their hydroxy and ether segments, they may optionally contain other functional groups such as amino groups and quaternized amino groups.

The post-reaction of the copolyester with additional hydrophilic entities is carried out under milder conditions than those used in synthesizing the base copolyester. Most are carried out at temperatures of about 150° C. or above, at atmospheric pressure, with temperatures of 180 to 200° C. being preferred. In some cases vacuum is also applied, but the overall conditions are less vigorous than in the preparation of the base copolyesters. Additionally, when the post-reactant is charged to the heated base copolymer, a reduction in viscosity may initially occur, indicating a reduction in the average molecular weight of the polymer. As the post-reaction proceeds, the viscosity of the mass may increase. However, the post-reaction step is not carried out long enough or under sufficiently severe conditions so as to result in an intractable mass.

Polyoxypropyleneamines

Suitable polypropylene oxide polymers for use herein include a polymer of polypropylene oxide which is terminated on one or both ends with amine groups, or functionalized amine groups such as amide or urea groups.

The polyoxypropyleneamines of this invention have the following formulae:

I. 

wherein x is 6–100; $R_1$ is $C_1$–$C_{24}$ alkyl, $C_1$–$C_{24}$ aryl, $C_1$–$C_{24}$ alkylaryl, or $C_1$–$C_{24}$ alkenyl; $R_2$ is H or $R_1$; $R_3$ is H, $CH_3$, or $CH_2CH_3$ wherein the ratio of $(CH_3+CH_2CH_3)/H$ in the repeat unit is greater than or equal to 6; $R_4$ is $R_2$, $R_1C(=O)$, $R_1N(R_2)C(=O)$, or $R_1$—$[OCH_2CH(R_3)]_x$—O—$CH_2CH(CH_3)$—$N(R_2)C(=O)$ and $R_5$ is $NHR_4$ or $OR_1$ wherein x, $R_1$ and $R_4$ are as defined above.

These are polyoxypropylenediamines optionally end-capped on one or both ends with ether, amide, or urea linkages.

II. $A[(OCH_2CHR_3)_xNHR_4]_3$ wherein A is 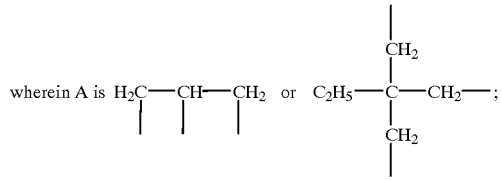

x is 6–100; $R_4$ is $R_2$, $R_1C(=O)$, $R_1N(R_2)C(=O)$, $R_1[(OCH_2CH(R_3)]_x$—O—$CH_2CH(CH_3)$—$N(R_2)C(=O)$; $R_1$ is $C_1$–$C_{24}$ alkyl, $C_1$–$C_{24}$ aryl, $C_1$–$C_{24}$ alkylaryl, or $C_1$–$C_{24}$ alkenyl; $R_2$ is H or $R_1$; $R_3$ is H, $CH_3$, or $CH_2CH_3$ wherein the ratio of $(CH_3+CH_2CH_3)/H$ in the repeat unit is greater than or equal to 6; and $R_5$ is $R_1$—$[OCH_2CH(R_3)]_x$—O—$CH_2CH(CH_3)$— wherein $R_1$, $R_3$ and x are as defined above.

These are polyoxypropylenetriamines that were formed from the reaction of a triol with propylene oxide, followed by animation.

Many of these polyoxypropyleneamines are available commercially. One commonly known commercial line of polyoxypropylamines includes members of the JEFFAMINE series of polyoxyalkyleneamine products. JEFFAMINE is a tradename of the Huntsman Corporation, Houston, Tex., for their line of polyoxyalkyleneamine that includes both poly(propylene oxide) as well as poly(ethylene oxide) amines. Only the polytpropylene oxide)-based materials are suitable for use in the present invention.

Polypropylene glycol/carbamates

Suitable polypropylene oxide polymers of the present invention include polymers of polypropylene oxide which are capped on one or both ends with carbamate groups, said polymers having more than 4 propylene oxide units and an average molecular weight of at least 300.

These poly(propylene oxide) polymers terminated with carbamate groups are conveniently prepared by reacting polypropylene glycol polymers with alkyl or aryl mono, di-, or triisocyanates. When the isocyanate group reacts with the hydroxyl endgroup(s) of the polypropylene glycol, the polypropylene glycol becomes endcapped or terminated with a carbamate group. A polyisocyanate can react with more than one polypropylene glycol polymer chain to produce branched or repeating block structures. The number of hydroxyl groups that are on the polypropylene glycol polymer and whether the endcapping moiety has one, two, or three isocyanate groups determines whether or not the resulting polypropylene glycol carbamate product has repeating polypropylene glycol/carbamate blocks.

These carbamate-capped polypropylene glycols have the following formulae:

III. $R_6—[OCH_2CH(R_3)]_x—O—C(=O)NHR_1$ wherein x is 4–100; $R_1$ is $C_1–C_{24}$ alkyl, $C_1–C_{24}$ aryl, $C_1–C_{24}$ alkylaryl, or $C_1–C_{24}$ alkenyl; $R_2$ is H or $R_1$; $R_3$ is H, $CH_3$, or $CH_2CH_3$ wherein the ratio of $(CH_3+CH_2CH_3)/H$ in the repeat unit is greater than or equal to 6; and $R_6$ is $R_2$ or $R_1NHC(=O)$.

These are polypropylene glycols or polypropylene glycol monoethers endcapped with mono-isocyanates to give polypropylene glycol carbamates or are polypropylene glycols endcapped on both ends with mono-isocyanates to give polypropylene glycol di-carbamates.

IV. $R_1—\{[OCH_2CH(R_3)]_x—O—C(=O)NH—R_1—NHC(=O)—\}_y[OCH_2CH(R_3)]_x—OR_1$ wherein y is 1–5; x is 4–100; $R_1$ is $C_1–C_{24}$ alkyl, $C_1–C_{24}$ aryl, $C_1–C_{24}$ alkylaryl or $C_1–C_{24}$ alkenyl; and $R_3$ is H, $CH_3$, or $CH_2CH_3$ wherein the ratio of $(CH_3+CH_2CH_3)/H$ in the repeat unit is greater than or equal to 6; and the molecular weight is below about 10,000.

These are prepared from two polypropylene glycol monoethers reacted with a diisocyanate to give polypropylene glycol ether di-carbamates, or are the reaction product of polypropylene glycol with a di- or triisocyanate. Because the polypropylene glycols are difunctional and the isocyanates are di- or trifunctional, high molecular weight products can be obtained. The molecular weight is controlled by how much monofunctional polypropylene glycol monoether is used. There are many such known compositions. Only those having molecular weight less than about 10,000 are suitable for use in the present invention.

The Formulae III and IV compositions are prepared by mixing together a suitable propylene glycol and isocyanate in a suitable solvent with heating in the presence of a catalyst such as dibutyltin dilaurate. An example preparation of a carbamate-capped polypropylene glycol suitable for this invention is detailed in Example 19.

Polypropylene glycol/polyester

Suitable polypropylene oxide polymers of the present invention include polymers of polypropylene oxide which are capped on one or both ends with di-or tri- carboxylic acids, carboxylic acid halides, or esters (C) to make poly (propylene oxide)-block polyesters. These have the structure of Formula V and are prepared according to the following reaction:

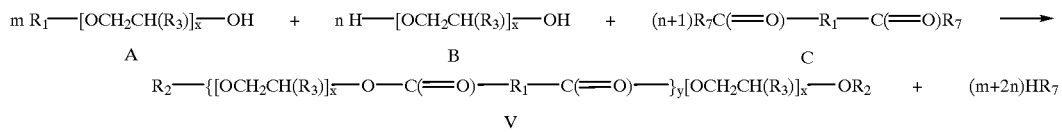

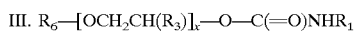

wherein $R_1$ is $C_1–C_{24}$ alkyl, $C_1–C_{24}$ aryl, $C_1–C_{24}$ alkylaryl, $C_1–C_{24}$ alkenyl; $R_2$ is H or $R_1$; $R_3$ is H, $CH_3$, $CH_2CH_3$ and the ratio of $(CH_3+CH_2CH_3)/H$ in the polymer is greater than or equal to 6; $R_7$ is OH, $OR_1$, Cl, Br; x=6–70; y is 1–30, m is 1–2, and n is 0–29.

When the acid, acid chloride, or ester group of (C) reacts with the terminal hydroxyl group(s) of the polypropylene glycol (B) or the polypropylene glycol monoether (A), the polypropylene glycol becomes endcapped or terminated with an ester group. Polypropylene glycol monoethers (A) terminate the block copolymers, so the higher the ratio of m/n (or A/B) the lower the molecular weight of the product copolymer (V). Ratios of A to B range from 0 to 2:1. A particularly useful ratio of A/B is 2:1.

The Formula V compositions are prepared by condensation of materials A, B, and C as defined above with an esterification catalyst with heating as appropriate and removal of $HR_7$ as appropriate. An example preparation of a polytpropylene oxide)-block polyester suitable for this invention is detailed in Example 23.

The above-defined compositions of or used in the present invention optionally contain at least one of a dispersing agent, surfactant, wetting agent, thickening agent, antistatic agent, coloring agent, fiber lubricant, softener, other surface active agent and hydrophilic agent, other ingredients which impart desirable properties for a particular application, or a mixture thereof.

The above-defined aqueous-based compositions of the present invention preferentially include a wetting or dispersing agent to aid in dispersion. Still more preferentially the wetting or dispersing agent is a nonionic surfactant having ethylene oxide moieties and hydrophobic portions. Suitable examples of these materials include ethoxylated alkyl phenols such as some "IGEPAL" nonionic surfactants sold by Rhone-Poulenc Inc., Cranbury N.J., such as "IGEPAL" CO-970; lauryl alcohol ethoxylated with about 50 ethylene oxide molecules, such as "ETHIAL" LA 50 available from Ethox Chemicals Inc. Greenville, S.C.; branched fatty alcohol ethoxylates such as "MERPOL" SE, available from E.I. du Pont de Nemours and Company, Wilmington, Del.; and branched chain ethoxylated alcohol such as "POLYWET" A or B, containing a mixture of branched alcohol ethoxylates with about 2 to 13 ethoxy groups along with a solubilizing agent such as sodium xylene sulfonate, which is available from Peach State Labs Inc., Rome, Ga.

Suitable wetting or dispersing agents or surfactants also include a cationic surfactant, such as "ARQUAD" 12/50 (dodecyl trimethylammonium chloride in water) or 16/50 (hexadecyl trimethylammonium chloride in water), available from Akzo Nobel Chemicals, Inc. Chicago, Ill.; sodium alkylnaphthalene sulfonate salts such as "ALKANOL" XC and branched fatty alcohol ethoxylates such as "MERPOL" SE both available from E.I. du Pont de Nemours and Company, Wilmington, Del.; polyoxyethylated (4) isodecyl alcohol such as "RHODASURF"DA-530 available from Rhone-Poulenc Surfactants and Specialties, Cranbury, N.J.; and sodium alkylbenzene sulfonate in water such as "BIO-SOFT" D40 available from Stepan Company, Northfield, Ill.

The present invention further comprises a method for imparting a durable hydrophilic coating to polyester, polypropylene, polyethylene, cotton, polyamide, or polyaramid fabric or fiber comprising application to the surface of the fabric or fiber of an effective amount of a composition of Formula I through V as defined above, or a mixture comprising one of Formula I through V and ZELCON.

These compositions are applied to the fabric or fiber by any suitable means such as wiping, painting, dipping, foaming, feeding at the nip of a roller, spraying, or other means. The composition is typically applied at a minimum level of at least 0.07% weight of solids on fiber, preferably at least 0.25% weight of solids on fiber, to achieve water wettability and durability. After drying or removal of the solvent, a durable hydrophilic coating remains on the fabric or fiber surface. This coating causes water placed on the surface to rapidly wet the fabric and to pass through the fabric layer.

The present invention further comprises a woven or nonwoven polyester, polyethylene, polypropylene, cotton, polyamide or polyaramid fabric or fiber having applied to its surface any of the above defined compositions of Formula I through V, or a mixture comprising one of Formula I through V and ZELCON, or treated by any of the above inventive methods.

The inventive compositions and methods impart durable hydrophilic character to polyester, polypropylene, polyethylene, cotton, polyamide or polyaramid fabrics or fibers in woven or nonwoven form. Such durability is measured in the trade by what are called "insult tests," and repeated exposures to moisture or water washes are referred to as "insults." In the "insult tests" described below on polypropylene, the inventive compositions and the compositions used in the method of the present invention imparted hydrophilic character with durability.

The compositions, methods, fabrics and fibers of the present invention are useful in diapers, incontinence pads, agricultural fabrics for landscaping or mulching, and filtration devices wherein the ability to transmit water through the fabric is desirable. The present invention is also useful in clothing and sportswear where wicking away of moisture is desirable. It has also been found that the compositions of the present invention act as a softener for polypropylene, polyethylene polyester, cotton, polyamide and polyaramid articles as well. The compositions of the present invention are also useful in applications where it is desirable to make a fiber surface more hydrophilic for better adhesion or easier incorporation into water-borne compositions such as cement mixtures or paper pulps. Other applications for the inventive compositions, especially the polypropylene glycol block polyesters, include usage as soil-release treatments for garments and as slickeners for polyester fiberfill.

In the present application, in particular in the following examples, tradenames used are defined as follows and are indicated by capitalization.

ZELCON PG polymer is a polyoxyethylene terephthalate and polyethylene terephthalate block copolymer, which is generated by dehydrating ZELCON 5126. ZELCON 5126 is ZELCON as previously defined dispersed in water with a surfactant.

ALKANOL XC is a sodium alkylnaphthalene sulfonate salt.

MERPOL SH and MERPOL SE are branched fatty alcohol ethoxylates with average molecular weights between about 350 and 650. MERPOL A is an octyl alcohol phosphate ester mixture.

ZELCON 5126, ZELCON PG, ALKANOL XC, MERPOL SH, MERPOL SE. and MERPOL A, are available from the E. I. du Pont de Nemours and Company, Wilmington, Del.

MILEASE T is a polyoxyethylene terephthalate and polyethylene terephthalate block copolymer. It is available from the Imperial Chemical Industries Limited, London, England.

UCON LB-series lubricants are available from the Union Carbide Chemicals and Plastics Company, South Charleston, W.Va, 25303 USA. These are polypropylene glycol monobutyl ethers of molecular weights of 340 (for LB65) to 2490 (for LB171S).

DALCOL 17 is a propoxylated linear fatty alcohol with molecular weight between 1100 and 1200. It is available from the ARCO Chemical Company, Newtown Square, Pa., 19073 USA.

PLURACOL 1010 and 2010 are polypropylene glycols with average molecular weights of 1050 and 2000, respectively. PLURONIC P-103, P-105, and F-68 are polyoxyethylene/polyoxypropylene block copolymers with HLB (hydrophilelipophile balance) values of 9, 15, and 29, respectively. They are available from BASF Wyandotte Corporation, Wyandotte, Mich., 48192 USA.

POLYWET A and B are both a mixture of a polyoxyethylated branched fatty alcohol (isodecyl) and sodium xylene sulfonate, and they are available from Peach State Labs, Inc., Rome, Ga, 30162 USA.

ARQUAD 12/50 or 16/50 are each a cationic surfactant, available from Akzo Nobel Chemicals, Inc., Chicago, Ill., 60606 USA. ARQUAD 12/50 is a solution of dodecyl trimethylammonium chloride in water. ARQUAD 16/50 is an aqueous solution of hexadecyl trimethylammonium chloride.

$R_{14}$ODASURF DA-530 is polyoxyethylated (4) isodecyl alcohol. IGEPAL CO-970 is polyoxyethylated (50) nonylphenol. Both are available from Rhone-Poulenc Inc. Cranbury, N.J. 08512 USA.

ETHAL LA-50 is polyoxyethylated (50) lauryl alcohol, available from the Ethox Chemicals, Inc., Greenville, S.C., 29606 USA.

BIOSOFT D40 is a 40% aqueous solution of a sodium alkylbenzene sulfonate, available from the Stepan Company, Northfield, Ill. 60093 USA.

JEFFAMINE M-2005 is methoxypoiy(oxyethylene/oxypropylene)-2-propylamine, ratio of oxypropylene to oxyethylene of 39/6, approximate molecular weight of 2000. JEFFAMINE D-2000 and D4000 (also known as XTJ-5 10) are polyoxypropylene diamines with approximate molecular weights of 2000 and 4000, respectively. JEFFAMINE T-403 is trimethylolpropanyl poly(oxypropylene) triamine with approximate molecular weight of 440. JEFFAMINE XTJ-509 is glyceryl poly(oxypropylene) triamine with approximate molecular weight of 3000. JEFFAMINE products are available from the Huntsman Corporation, Houston, Tex., USA.

EXAMPLE 1

A dispersion was prepared using the components described below.

| Ingredients | Weight |
| --- | --- |
| ZELCON PG | 50 g |
| JEFFAMINE M-2005 | 10 g |
| ETHAL LA-50 | 3.0 g |
| POLYWET B | 6.6 g |
| Distilled water | 350 g |
| Total dispersion (total weight) | 420 g |

A round bottom flask was equipped with a stirrer, thermocouple, nitrogen line and charged with a polyoxyethylene terephthalatepolyethylene terephthalate block copolymer (ZELCON PG polymer). The vessel was swept well with nitrogen, then heated to 180° C. It was stirred until fully melted. While it was melting, methoxypoly(oxyethylene/oxypropylene)-2-propylamine (JEFFAMINE M-2005) was dispersed in a mixture of the water, polyoxyethylated (50) lauryl alcohol (ETHAL LA-50), and a mixture of polyoxyethylated isodecyl alcohol and sodium xylene sulfonate (POLYWET B) in a rapidly stirring blender. Then the molten ZELCON PG polymer was added and the mixture stirred for 3–5 minutes or until well mixed. After diluting the mixture was sonicated or homogenized to complete the dispersion process.

The weight of ZELCON PG given above was its initial weight. After melting, a small amount estimated at 2 to 3 grams clung to the sides of the flask and was lost in transfer.

EXAMPLES 2–3

The following compositions were prepared using the procedure of Example 1. All formulations were aqueous; after the initial dispersion was made to a concentration of between 5 to 25% solids, more water was added to dilute the dispersion for application in the pad bath used for performance testing. This allowed the adjustment of the desired pickup of material onto the fabric. The pickup of aqueous solution by the fabric (wet pickup) was in the range of 66 to 82% of the weight of the fabric. This allowed a calculation of the solid material applied to the fabric. The formula used:

bath solids concentration (%)×wet pickup (%)/1100=solids applied to fiber (%)

TABLE 1

| Ex. No. | Hydrophilic Copolyester | Polypropylene Oxide Polymers | Surfactants |
| --- | --- | --- | --- |
| 2 | ZELCON PG 50 g | Poly(propylene glycol) di(phenyl carbamate) 10 g Note 1 | POLYWET B 6.6 g ETHAL LA-50 3.0 g |
| 3 | ZELCON PG 50 g | Poly(propylene glycol)/polyester adduct 10 g Note 2 | POLYWET B 6.6 g ETHAL LA-50 3.0 g |

Note 1: This is the reaction product of polypropyleneglycol (MW 1,000) with two equivalents of phenyl isocyanate, and is an example of Formula V.
Note 2: This is the DALCOL 17/PLURACOL 1010/dimethyl terephthalate 2:1:2 adduct prepared as described in Example 23 hereinafter and is an example of Formula V.

In the tests below, the fiber was a spunbond polypropylene sheet. A variation on a standard water repellency test was used. If a drop of pure water wet out completely on the fabric, the fabric was rated w/w for "water wet." Untreated polypropylene rates as not wettable. Treated fabrics that rate w/w were "insulted" to test durability and then treated again. The insult test comprised cutting out a circular piece of the treated fabric, placing the circle on a glass fritted funnel, and then rapidly drawing 100 mL of distilled water through the circle of fabric. The circle was then dried again and retested for water wetting. The more cycles of "insults" with full water wetting remaining, the better (these are rated as "successful" in the table below. A plus (+) following a number indicates that the test were discontinued before failure occurred.). The results of the performance testing are listed Table 2.

TABLE 2

| | | Performance Testing Water Repellency Tests | | No. of |
| --- | --- | --- | --- | --- |
| Example No. | Solids on Weight of Fiber | Initial | After 1st "Insult" | Successful "Insults" |
| 1 | 0.5 | w/w | w/w | 1 |
| 1 | 1.0 | w/w | w/w | 1 |
| 2 | 0.5 | not wettable | | |
| 2 | 1.0 | w/w | not wettable | 0 |
| 3 | 0.5 | w/w | w/w | 1 |
| 3 | 1.0 | w/w | w/w | 2 |

EXAMPLES 4–9

Methoxypoly(oxyethylene/oxypropylene)-2-propylamine (JEFFAMINE M-2000) polymer, (Formula II with $R_1=CH_3$, $R_3 =CH_3$ and H, ratio of $CH_3H=32/3$, $R_4=H$, x=35) was dissolved in ethyl acetate and applied via padding onto polypropylene coverstock at the application rates shown in Table 3.

TABLE 3

| Example Number | Solids on Weight of Fiber (%) | Initial Wettability | No. of Successful Insults |
| --- | --- | --- | --- |
| 4 | 0.07 | w/w | 3 |
| 5 | 0.18 | w/w | 6 |
| 6 | 0.24 | w/w | 6 |
| 7 | 0.52 | w/w | 6 |
| 8 | 0.96 | w/w | 6 |
| 9 | 0.99 | w/w | 4 |

These examples showed that the polyoxypropyleneamines of Formula II were effective at providing a durable wettable coating for polypropylene fiber.

EXAMPLES 10–12

Glycerol poly(oxypropylene)triamine (JEFF AMINE XTJ-509) polymer (Formula II with A = 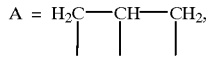

$R_4=H$, x=50 [ave.]) was dissolved in ethyl acetate and applied via padding onto polypropylene coverstock at the application rates shown in Table 4.

TABLE 4

| Example Number | Solids on Weight of Fiber (%) | Initial Wettability | No. of Successful Insults |
| --- | --- | --- | --- |
| 10 | 0.09 | w/w | 3 |
| 11 | 0.1 | w/w | 6 |
| 12 | 0.5 | w/w | 8 |

These examples showed that the polyoxypropylenetriamines of Formula II were effective at providing a durable wettable coating for polypropylene fiber.

EXAMPLES 13–14

Polyoxypropylene diamine (JEFFAMINE XTJ-510), (Formula I with $R_4$=H, x=68 (ave.) was dissolved in ethyl acetate and applied via padding onto polypropylene coverstock at the application rates shown in Table 5.

TABLE 5

| Example Number | Solids on Weight of Fiber (%) | Initial Wettability | No. of Successful Insults |
|---|---|---|---|
| 13 | 0.1 | w/w | 7 |
| 14 | 0.5 | w/w | 9+ |

These examples showed that the polyoxypropylenediamines of Formula I were effective at providing a durable wettable coating for polypropylene fiber.

EXAMPLES 15–16

Trimethylolpropanyl poly(oxypropylene)triamine (JEFFAMINE T-403),

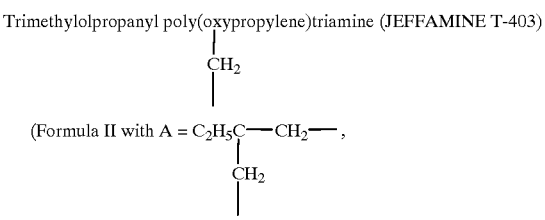

(Formula II with A = $C_2H_5C-CH_2-$, $R_4$=H, x=5–6 [ave.]) was dissolved in ethyl acetate and applied via padding onto polypropylene coverstock at the application rates shown in Table 6.

TABLE 6

| Example Number | Solid on Weight of Fiber (%) | Initial Wettability | No. of Successful Insults |
|---|---|---|---|
| 15 | 0.1 | w/w | 3 |
| 16 | 0.5 | w/w | 3 |

These examples showed that polyoxypropylenetriamines of Formula II were effective at providing a durable wettable coating for polypropylene fiber.

EXAMPLES 17–18

Polyoxypropylene diamine (JEFFAMINE D-2000), (Formula I with $R_4$=H, x=33 (ave.) was dissolved in ethyl acetate and applied via padding onto polypropylene coverstock at the application rates shown in Table 7.

TABLE 7

| Example Number | Solids on Weight of Fiber (%) | Initial Wettability | No. of Successful Insults |
|---|---|---|---|
| 17 | 0.1 | w/w | 3 |
| 18 | 0.5 | w/w | 4 |

These examples showed that the polyoxypropylenediamines of Formula I were effective at providing a durable wettable coating for polypropylene fiber.

EXAMPLES 19–22

Preparation of 2:1 Adduct of monobutyl ether polypropylene p-phenylene diisocyanate (Formula IV)

| Ingredient | Equivalents | Moles | M.W. | Weight | Volume |
|---|---|---|---|---|---|
| p-Phenylene diisocyanate (PPDI) | 1.0 | 0.074 | 160.13 | 11.9 g | |
| UCON LB-135* | 2. | 0.015 | 640 | 100 g | |
| Dibutyltin dilaurate | | | 631.56 | 1 drop of diluted solution | |
| Toluene | | | | | 30 mL |
| Products | | | | | |
| UCON/PPDI 2:1 adduct | 1.0 | | | 112 g | |

*UCON LB-135 is polypropylene glycol monobutyl ether with molecular weight approximately 640. It is a product of the Union Carbide Chemicals and Plastics Company, South Charleston, WV.

Monobutyl ether polypropylene glycol (UCON LB-135 polymer), p-phenylene diisocyanate (PPDI), and toluene were stirred and heated to 55° C. under a $N_2$ blanket. When the solution was homogeneous and stirring well, one drop of a diluted solution of dibutyltin dilaurate catalyst in toluene (1 drop of dibutyltin dilaurate diluted with 10 drops of toluene) was added. A heat rise occurred. After the heat rise ended, the temperature was increased to 100° C. and held for 3 hours. After the three hours, the toluene was removed. The IR of the product confirmed that a carbamate was formed ($1726 \text{ cm}^{-1}$ band) and that no isocyanate remained.

Also prepared with this method was polypropylene glycol, 1000 molecular weight, endcapped at each end with phenyl isocyanate. Its structure fits composition of Formula III wherein $R_1$ is phenyl, $R_3$ is methyl, and x=10 (ave).

The UCON/PPDI 2:1 adduct prepared by the method described above was dissolved in ethyl acetate and applied via padding onto polypropylene coverstock at the application rates shown in Table 8.

TABLE 8

| Example Number | Solids on Weight of Fiber (%) | Initial Wettability | No. of Successful Insults |
|---|---|---|---|
| 19 | 0.1 | w/w | 2 |
| 20 | 0.25 | w/w | 6 |
| 21 | 0.52 | w/w | 5 |
| 22 | 0.95 | w/w | 2 |

These examples showed that the polypropylene glycol/carbamate polymer of Formula III was effective at providing a durable wettable coating for fiber.

EXAMPLES 23–29

Preparation of a 2:1:2 adduct of Propoxylated fatty alcohol/Poly(propylene glycol)/Dimethyl Terephthalate.

A propoxylated linear fatty alcohol of molecular weight 1100 to 1200 (DALCOL 17) 119 g, poly(propylene glycol) having average molecular weight of 1050 (PLURACOL 1010) 50.5 g, dimethyl terephthalate 19.4 g, tetraisopropyl titanate 0.15 g, and decane 200 mL were combined and heated to 190° C. When all of the methanol (6.4 g) was azeotroped off, the reaction mass was cooled. Water (100 g)

was added and the mixture stirred vigorously to convert the tetraisopropyl titanate to $TiO_2$. The precipitated $TiO_2$ was filtered out, then the organic solution washed again with 100 mL of water. When the washings were complete the organic layer was dried with magnesium sulfate, filtered, and the solvent removed. The product is a clear oil. Yield 173 g.

In the following set of examples, the DALCOL 17/PLURACOL 1010/dimethyl terephthalate 2:1:2 adduct described above was dissolved in ethyl acetate, padded onto polypropylene coverstock, air dried, and tested for wettability.

TABLE 9

| Example Number | Solids on Weight of Fiber (%) | Initial Wettability | No. of Successful Insults |
|---|---|---|---|
| 23 | 0.11 | w/w | 17+ |
| 24 | 0.57 | w/w | 11 |
| 25 | 0.056 | w/w | 2 |
| 26 | 0.028 | w/w | 3 |
| 27 | 0.011 | w/w | 1 |
| 28 | 0.11 | w/w | 9 |
| 29 | 0.57 | w/w | 11 |

These examples showed that the polypropylene glycol/polyester polymer of Formula V was effective at providing a durable wettable coating for polypropylene fiber.

EXAMPLES 30–41

In the following set of examples, the above polymer of Examples 24–30 was dissolved in ethyl acetate, padded onto a woven polyester fabric, air dried, and tested for wettability.

TABLE 10

| Example Number | Solids on Weight of Fiber (%) | Initial Wettability | No. of Successful Insults |
|---|---|---|---|
| 30 | 0.11 | w/w | 25+ |
| 31 | 0.33 | w/w | 25+ |
| 32 | 0.56 | w/w | 25+ |
| 33 | 1.04 | w/w | 25+ |
| 34 | 0.11 | w/w | 14+ |
| 35 | 0.33 | w/w | 14+ |
| 36 | 0.56 | w/w | 14+ |
| 37 | 1.04 | w/w | 14+ |
| 38 | 0.11 | w/w | 14+ |
| 39 | 0.33 | w/w | 14+ |
| 40 | 0.56 | w/w | 14+ |
| 41 | 1.04 | w/w | 14+ |

These examples showed that the polypropylene glycol/polyester polymer (Formula V) was effective at providing a durable wettable coating for polyester fabric.

EXAMPLES 42–46

In the following set of examples, the DALCOL 17/PLURACOL 1010/dimethyl terephthalate 2:1:2 adduct (30 g) prepared as in Example 23 was dispersed in water (100 g) with polyoxyethylene/polyoxypropylene block copolymers URONIC P-103 1.2 g, PLURONIC P-105 1.2 g, and PLURONIC F-68 1.0 g) a mixture of polyoxyethylated isodecyl alcohol and sodium xylene sulfonate (POLYWET B) 1.6 g, dispersing and wetting agents, padded onto polypropylene coverstock, air dried, and tested for wettability.

TABLE 11

| Example Number | Solids on Weight of Fiber (%) | Initial Wettability | No. of Successful Insults |
|---|---|---|---|
| 42 | 0.02 | not w/w | — |
| 43 | 0.023 | not w/w | — |
| 44 | 0.11 | w/w | 0 |
| 45 | 0.1 | w/w | 0 |
| 46 | 0.5 | w/w | 2 |

What is claimed is:

1. A mixture comprising a polymer of formula III and a hydrophilic polyester copolymer with repeating segments of ethylene terephthalate units containing 10–50% by weight of polyoxyethylene terephthalate units, derived from a polyoxyethylene glycol of average molecular weight of from about 300 to about 6,000, and the molar ratio of ethylene terephthalate units to polyoxyethylene terephthalate units in the polymeric compound is between 2:1 and 6:1, where formula III is

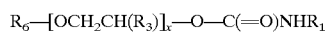

wherein x is 4–100;

$R_1$ is $C_1$–$C_{24}$ alkyl, $C_1$–$C_{24}$ alryl, $C_1$–$C_{24}$ alkylaryl, or $C_1$–$C_{24}$ alkenyl;

$R_2$ is H or $R_1$;

$R_3$ is H, $CH_3$, or $CH_2CH_3$ wherein the ratio of ($CH_3$+ $CH_2CH_3$)/H in the repeat unit is greater than or equal to 6; and $R_6$ is $R_2$ or $R_1NHC(=O)$.

2. A mixture comprising a polymer of Formula IV and a hydrophilic polyester copolymer with repeating segments of ethylene terephthalate units containing 10–50% by weight of polyoxyethylene terephthalate units, derived from a polyoxyethylene glycol of average molecular weight of from about 300 to about 6,000, and the molar ratio of ethylene terephthalate units to polyoxyethylene terephthalate units in the polymeric compound is between 2:1 and 6:1, where formula IV is

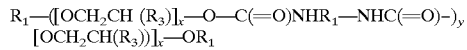

wherein y is 1–5;

x is 4–100;

$R_1$ is $C_1$–$C_{24}$ alkyl, $C_1$–$C_{24}$ aryl, $C_1$–$C_{24}$ alkylaryl, or $C_1$–$C_{24}$ alkenyl; and $R_3$ is H, $CH_3$, or $CH_2CH_3$ wherein the ratio of ($CH_3$+ $CH_2CH_3$)/H in the repeat unit is greater than or equal to 6; and the molecular weight is below about 10,000.

* * * * *